UNITED STATES PATENT OFFICE.

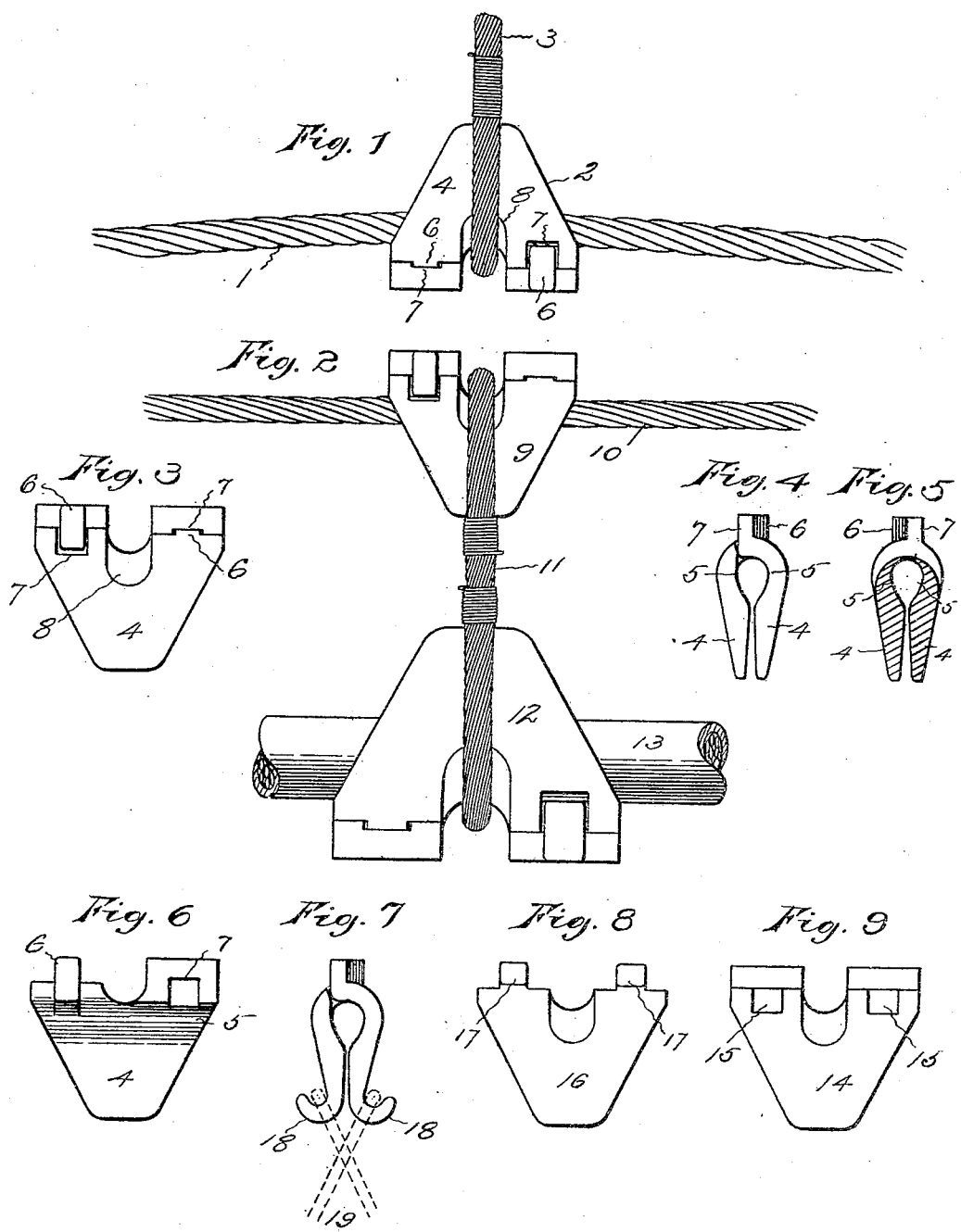

WILLARD H. KEMPTON, OF HARTFORD, CONNECTICUT, ASSIGNOR TO THE JOHNS-PRATT COMPANY, OF HARTFORD, CONNECTICUT, A CORPORATION OF CONNECTICUT.

CABLE-CLAMP.

931,930.  Specification of Letters Patent.  Patented Aug. 24, 1909.

Application filed August 27, 1908.  Serial No. 450,544.

*To all whom it may concern:*

Be it known that I, WILLARD H. KEMPTON, a citizen of the United States, residing at Hartford, in the county of Hartford and State of Connecticut, have invented a new and useful Cable-Clamp, of which the following is a specification.

This invention relates to a clamp which is particularly adapted for grasping a cable, such as the messenger cable of an overhead electric railway line construction of the catenary type, for pulling the cable horizontally and holding it over the center of the track at switches and curves, but it is also adapted for grasping a multiple wire incased telephone cable which is usually suspended from a supporting cable.

The object of the invention is to provide a very simple, cheap, easily applied and quickly secured clamp for such purposes.

Figure 1 of the accompanying drawings illustrates a plan of a short section of a messenger cable of a catenary electric railway line, drawn over to one side by a pull off cable that passes around a clamp that embodies this invention, and holds the parts together. Fig. 2 shows an elevation of a short section of lead covered telephone cable suspended from a smaller steel cable with the suspending wire passing around a clamp that grasps the telephone cable and a clamp that grasps the supporting cable. Fig. 3 is a side view of the clamp. Fig. 4 is an edge view of the clamp. Fig. 5 is a transverse vertical section of the clamp. Fig. 6 is a view of the inside face of one member of the clamp. Fig. 7 is an edge view of a modified form of the clamp. Fig. 8 is a side view of a modified form of one member of the clamp. Fig. 9 is a side view of the complementary member used with this modified form of clamp.

The cable 1 which is shown in Fig. 1 of the drawings is a stranded metallic cable of common construction, such as is employed to support the overhead conductor wire of an electric railway. Clasping this messenger cable is the clamp 2 about which passes the pull off cable 3 which may be a common twisted wire cable of the required strength to draw the messenger cable laterally so that it will run over the center of the track.

The clamp is preferably formed of two similar pieces which may be of cast, forged or bent metal. Each of these pieces has an ear 4 with a groove 5 on the inner face which provides a section of the cable pocket, a tongue 6 that projects upwardly from the upper edge of the ear near one end, and a loop 7 that is on the upper edge of the ear near the other end. Between the tongue and the loop on the outer face of the ear near the upper edge is a shallow groove 8. These two members are put together with the messenger or supporting or other cable between them by thrusting the tongue of one part into the loop of the other part and then closing the ears together, in which position they are held by simply passing the pull off cable or hanging cable about them and securing the strain cable by twisting around or otherwise clamping the end of the strain cable to itself. When these two members are held together in this manner, they cannot separate and they tightly grip the cable if the cable is slightly larger than the cable opening between the parts, the grip being tighter the harder the strain on the strain cable.

As shown in Fig. 2 a clamp 9 of one size may be fastened about a supporting cable 10 of common construction by a hanger wire 11, which hanger can pass around and fasten together the parts of a clamp 12 of another size, which may clasp a lead covered telephone cable 13 of common construction. These clamps can be made in various sizes, and the members can be fastened together by wires or cords as well as cables, and of course they can be used for other purposes than the two illustrated.

If desired, as shown in Figs. 8 and 9, instead of making the two ears identical, that is, each ear having a tongue and a loop, one ear 14 may be provided with two loops 15 and the other ear 16 may be provided with two tongues 17, which tongues may be passed into the loops for securing the upper ends of the ears together, while the lower ends are held together by the binding of the pull over or supporting cable, wire or rope.

Hooks 18, Fig. 7, may be formed at the ends of the ears and the parts held together by the strain of wires, cables, or loops 19, arranged to pass through the hooks and cross below them. In this case it would be unnecessary to pass a binding cable around the ears. The pieces of this clamp are very simple to make, either by casting, bending or drop forging. No machine work for finishing is required, as they do not have to fit closely; and if the grooves in their inner faces when put together provide an opening that is somewhat smaller in diameter than the cable to be clasped, the binding or fastening cable causes them to grip the cable they clasp, tightly, and the harder the pull the more tightly they grip.

The invention claimed is:—

1. A new article of manufacture consisting of an ear having a groove extending longitudinally in its inner face near one edge for embracing a cable, a tongue and loop at said edge, and a groove on its exterior extending transversely and separating the tongue and the loop for receiving a supporting cable.

2. A clamp comprising two similar ears, each having a groove extending longitudinally in its inner face near one edge for bracing a cable, a tongue and loop at said edge, and a groove extending transversely on its exterior and separating the tongue and loop for receiving a supporting cable.

3. A clamp comprising a pair of similar ears having engaging tongues and loops on one edge hinging them together, a cable opening extending parallel with said hinged edges between the ears, both of said ears being of the same width and widest at the middle, said widest parts extending beyond the cable opening between them such a distance that pressure on the edges opposite the tongues and loops will clamp the cable between the ears and prevent the tongues and loops from disengaging, and means passing about the exterior of the ears and pressing the edges opposite the tongues and loops together.

4. The combination of a cable, a pair of ears clasping the cable, each of said ears having a portion of the cable pocket, and each ear having above the cable pocket a tongue and a loop, the tongue on one part entering and interlocking with the loop on the other part, and a cable passing transversely around the ears and binding them together, substantially as specified.

WILLARD H. KEMPTON.

Witnesses:
HARRY R. WILLIAMS,
JOSEPHINE M. STREMPFER.